United States Patent [19]
Keifer

[11] 3,708,856
[45] Jan. 9, 1973

[54] PROCESS FOR REPAIRING WORN AND DEFORMED RAILWAY FROGS
[75] Inventor: John N. Keifer, Indianapolis, Ind.
[73] Assignee: Indiana Metal Treating, Inc. Indianapolis, Ind.
[22] Filed: Sept. 3, 1971
[21] Appl. No.: 177,708

[52] U.S. Cl. .................29/401, 29/402, 29/527.4, 29/DIG. 48, 164/92, 246/459, 246/471
[51] Int. Cl. .............................................B23p 7/00
[58] Field of Search.............29/401, 402, 527.4, 530, DIG. 48; 164/76, 92; 246/471, 459, 460, 461

[56] References Cited

UNITED STATES PATENTS

| | | | |
|---|---|---|---|
| 938,893 | 11/1909 | Potter | 246/460 X |
| 1,480,370 | 1/1924 | Burton | 246/460 X |
| 1,933,139 | 10/1933 | Daley | 29/401 |
| 1,994,479 | 3/1935 | Lamborn | 219/76 |

OTHER PUBLICATIONS

Sales literature distributed by The McKay Company concerning the use of Frogalloy and Hardalloy 118 welding rod, 105 Liberty Ave., Pittsburgh, Penna., seven pages.

Primary Examiner—Richard J. Herbst
Assistant Examiner—Donald C. Reiley, III
Attorney—Verne A. Trask et al.

[57] ABSTRACT

Worn and deformed railway crossing frogs are repaired thus: (a) arc-gouge away cracks and battered and work-hardened metal, (b) weld-in gouged cavities while cooling the frog in a water bath, (c) build up new wear surfaces with rod or wire-fed welding while the frog is cooled in the water bath, (d) notch the base walls and flanges (or cut completely apart) to permit straightening, (e) clamp in straightened position, (f) weld in the notches (or reweld the cuts) and (g) machine or grind to shape and size.

11 Claims, 9 Drawing Figures

PATENTED JAN 9 1973  3,708,856

INVENTOR
JOHN N. KEIFER

PROCESS FOR REPAIRING WORN AND DEFORMED RAILWAY FROGS

BACKGROUND OF THE INVENTION

Railway crossing frogs are subject to heavy wear from impact and abrasion. For best life, they are commonly made as castings of manganese steel. Because of the characteristics of such steel, there has heretofore been no fully satisfactory procedure for repairing cast manganese frogs when worn and cracked or deformed, except to a limited and superficial extent, especially for the reason that such steel castings are sensitive to heat and tend to crack and warp when subjected to rapid or uneven changes in temperature such as occur with conventional welding.

I have attempted to repair railway crossing frogs by conventional methods of welding to fill cracks and to replace worn metal by building up with weld metal, and to control cracking and warping by heating or heat treatment. Such control of the warping and cracking was not satisfactory. I then discovered that it was possible to repair and rebuild frogs by the process in accordance with the present invention, and thereby to produce frogs which appeared free of cracks and warpage. It was not apparent, however, whether such rebuilt frogs would withstand the severe conditions of actual use to a sufficient extent to be of practical and economic use. To determine this, frogs so repaired have been installed and subjected to actual railway service for many months and have been found successful.

SUMMARY OF THE INVENTION

In accordance with the present invention, frogs are repaired by a process characterized in that substantially all of the welding for repair of cracks and especially all the welding to build up worn surfaces is done while the frog is cooled in a water bath, which avoids cracking and minimizes warping; and thereafter warpage is eliminated by notching or cutting the bottom walls of the frog to permit straightening and the notches or cuts are rewelded while the frog is clamped in straight position.

BRIEF DESCRIPTION OF THE DRAWINGS

The accompanying drawings illustrate the invention and show certain equipment and steps used in the process. In such drawings.

DESCRIPTION OF THE PREFERRED EMBODIMENT

Figure 1:
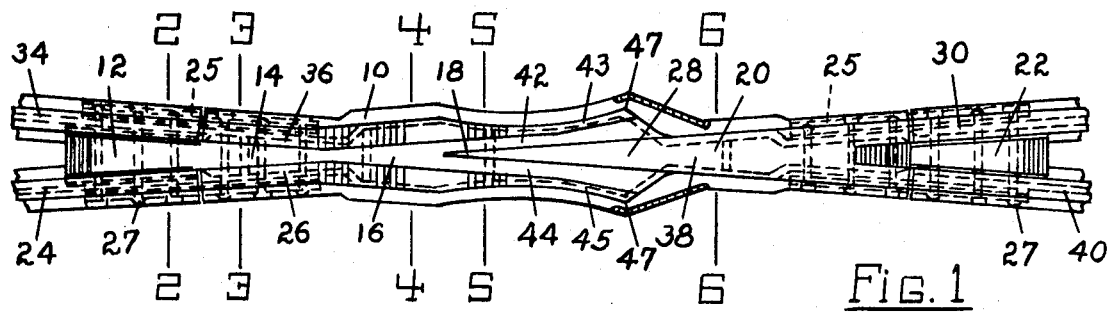
FIG. 1 is a plan view of a railway crossing frog.
Figure 2:
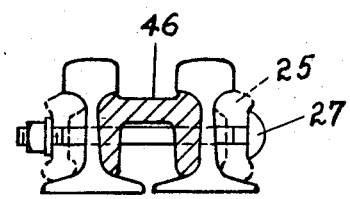
FIGS. 2 to 6 are sections taken on the correspondingly numbered lines of FIG. 1.
Figure 3:
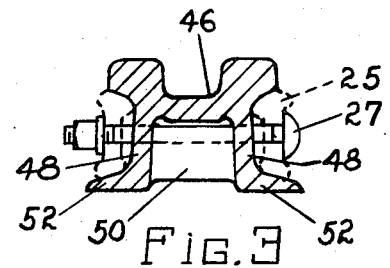
Figure 4:
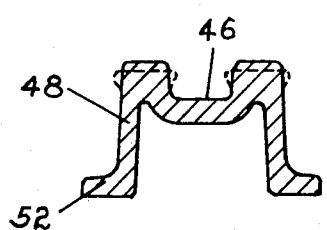
Figure 5:
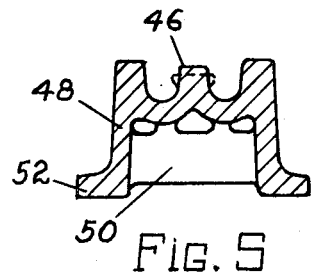
Figure 6:
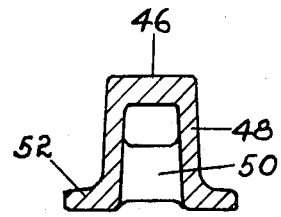

A representative railway crossing frog is shown in FIGS. 1-6. This comprises a main casting 10 which includes a fishtail toe extension 12, a toe portion 14, a throat 16, a point 18, a heel portion 20, and a heel fishtail extension 22. On the frog, a main wheel-way extends from a main toe rail 24 connected to one side of the toe extension 12, along a wheel-supporting surface 26 of the toe portion, thence to the frog point 18 and along a wheel-supporting surface 28 on the heel portion 20 to a main heel rail 30 attached to the upper side of the heel extension 22. A crossing wheel-way extends from a crossing toe rail 34, along a wheel supporting surface 36 of the toe section, thence to the frog point 18 and thence along a rail supporting surface 38 of the heel portion to a crossing heel rail 40 attached to the side of the heel extension 22 at the bottom of that extension as shown in FIG. 1. The rails 24, 30, 34 and 40 are fastened to the frog with joint bars 25 and bolts 27. Along side each wheel-way there is a channel flangeway to pass the flange of the rail wheel, and these channels cross at the throat 16 and pass along opposite sides of the point 18. It will be seen that the flangeway 42 for the main wheel-way appears above the point 18 in FIG. 1 and the flange-way 44 for the crossing wheel-way appears below the point 18 in FIG. 1. The two flangeways lie between the wheel-way surfaces 26 and 36 at the toe portion 14 and at the outer sides of the wheel-way surfaces 28 and 38 along the heel portion 20. Where the flange-ways emerge from the throat and run along opposite sides of the point 18 their outer side walls are continued to form guards 43 and 45 which terminate midway of the heel length and are outwardly flared at their ends 47. In the frog shown in the drawing, the guards 43 and 45 are integral parts of the frog casting. In other frogs, such guards are sometimes made as separate pieces and of different material from the manganese steel of the casting.

In the use of railway frogs, the greatest wear and battering of the surfaces occurs at and near the throat 16 and especially at the point 18, since these are the areas which receive greatest impact as car wheels run along the wheel ways and must cross the interruptions formed by the flange way channels. The end of the point may be completely broken and battered and the damage may extend far along its length, as indicated in dotted lines in FIG. 5. The wheel-way surfaces along the throat may likewise be cracked and battered as indicated in dotted lines in FIG. 4. Wear and battering also occur at the ends of the toe 14 and heel 20 where the frog joins the connected rails. The full length of the wheel-way surfaces 26–30 and 36–40 is subject to work-hardening. The greatest repair problems occur at and near the throat 16 and point 18, and to a lesser extent at the remote ends of the frog, but the work hardened metal along the intermediate surfaces may also require replacement. In repair operations it is common to resurface with weld metal along substantially the entire lengths of the wheel-ways.

As will be seen from FIGS. 2-6, the frog is formed as a hollow casting which has a continuous top wall 46 formed to provide the wheel-ways and flange-ways described above, has ribs 50 interconnecting the side walls 48 at spaced intervals along their length, and has mounting and bearing flanges 52 at the bottom edges of the side walls. Throughout the length of the frog, the casting is of a generally downwardly-open channel or hat section.

Figure 7:
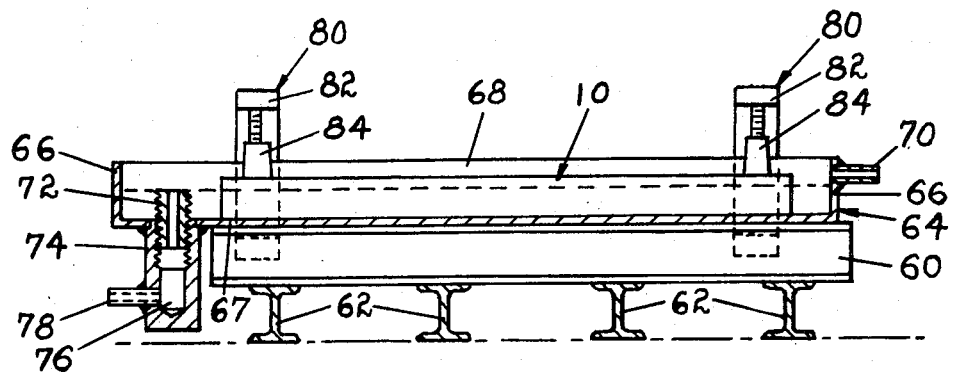
FIG. 7 is a somewhat diagrammatic side elevation, with parts broken away, of a water bath tank and clamp in which welding is done in accordance with the invention.

In the process of repairing railway frogs in accordance with the present invention, substantially all of the welding is done with the frog submerged in a water bath with the water level at or close below the point at which the welding is done in order to cool the main body of the casting and maintain it well below a temperature of 500° F. Also, it is desirable to clamp the frog against warping as the welding is done. Apparatus for providing the water bath and for clamping the frog against warpage is shown in FIG. 7. This consists of a heavy base frame or table 60 which may be made of a number of I-beams mounted in abutting side by side relation on supporting cross beams 62. The table 60 is of sufficient length and width to allow the frog to be laid flat on its upper surface. On top of the table 60 there is formed a water bath tank 64 having end walls 66 and side walls 68. The bottom may be the surface of the table 60, or may be a separate bottom wall 67. The tank has a water inlet 70, and at the opposite end has an overflow tube 72 which is vertically adjustable to control the water level in the tank. As shown, the overflow tube 72 is a threaded pipe screwed into a threaded collar 74 welded to the bottom wall 67 of the tank. The collar 74 may be connected to a sump 76 having a drain line 78.

Two clamping frames or yokes 80 are mounted on the table 60, and are desirably movable to different positions along its length. Each yoke includes a horizontal top beam 82, beneath which a jack 84 may be mounted to exert downward pressure on the end of a frog 10 resting on the bottom wall of the tank 66 and supported by the heavy and rigid table 60, to hold the frog against warping during welding operations. It has previously been proposed to clamp a frog against a supporting table for this purpose, but clamping alone is not sufficient.

The method of repairing railway frogs in accordance with the present invention is as follows:

1. Clean. The frog is dismantled by removing all joint bars, rail sections, separate guards, etc., and the frog is thoroughly cleaned of all dirt and grease and other foreign matter, as by steam cleaning, sand blasting, wire brushing, and the like.

2. Inspect. The frog is then inspected for cracks, battered metal, worn areas, work hardened metal and other defects.

3. Remove damaged metal. The battered and work hardened metal is removed as with an arc gouge to expose sound metal for the deposit of new metal by welding. All cracks are cut out down to sound metal and the cavities so formed are shaped with diverging or beveled sides, to permit good welding repair. The end of the frog point 18 is cut back at least an inch or two to permit its replacement with new metal. The frog is then cleaned and dressed to remove all cut metal and slag, and to present suitable surfaces of sound metal for the application of repair metal by welding. This is conveniently done by grinding to level off the exposed sound metal for convenient and uniform re-welding.

4. Weld-in cavities, in water bath. The frog is then placed in the water tank 66, and clamped with the jacks 84 to hold it flat against the bottom wall 67 and the table 60. Water is added to the water tank to a level just below the point at which welding is to be done, desirably within one-half inch below that point. Preferably, the gouged-out cracks are first filled by depositing new metal in molten state, as by hand welding with a stick electrode, working from the bottom of the cavity upward. The welding can be done in a conventional way, using good welding practices. It is not necessary to deposit only small amounts of weld metal and hammer it down before depositing more, as has been proposed by others. The water level should be raised as the work progresses to maintain the water close below the point at which welding is being done in order to keep as low a temperature as possible in the body of the casting. This welding is continued to substantially fill up the beveled cavities formed in the gouging-out step, to bring the new metal substantially to the surface of the adjacent sound metal. Slag should be removed by hand cleaning as the work progresses. This step should prepare a base to receive the re-surfacing metal which is substantially level throughout its length and without deep cavities to be filled as the surface metal is applied.

5. Re-surface weld. When all the gouged cavities have been filled substantially level with the adjacent surfaces, new metal in molten state is then applied to the wear surfaces of the frog to provide new wear surfaces as needed along the entire length of the wheel ways. This may be done by hand welding either with stick electrode or with a wire-feed welder, but is preferably done with automatic wire-feed equipment.

6. Weld length-wise. In welding to build up the wear surfaces, the welding should proceed from end to end on the frog and not across the frog. Wire feed welding should be adjusted to produce a bead of from ¾ to 1 inch wide running lengthwise of the frog, and additional beads should be laid down side-by-side progressively across the wear surface, lapping each pass a small amount to make the surface as smooth as possible. If more than one layer is necessary to bring the surface up to the desired level, each layer should be completed before the next is begun. Re-surface welding is continued in this manner until the frog is built up to a level which will provide metal for machining to a smooth surface meeting the design specifications for a new frog. This welding can proceed continuously, and it is not necessary to hammer each small deposit before depositing another, as others have proposed. Throughout this surface welding, the frog remains in the water bath, and the water level is maintained closely below the level at which welding is being done. This may be done by supplying water at a suitable rate to the water inlet 70, and by adjusting the water level control tube 72 upward or downward to maintain the water level.

7. Inspect for straightness. After welding, the frog is removed from the water tank and checked for straightness and alignment. If it is warped or bowed, it is then straightened.

Figure 8:
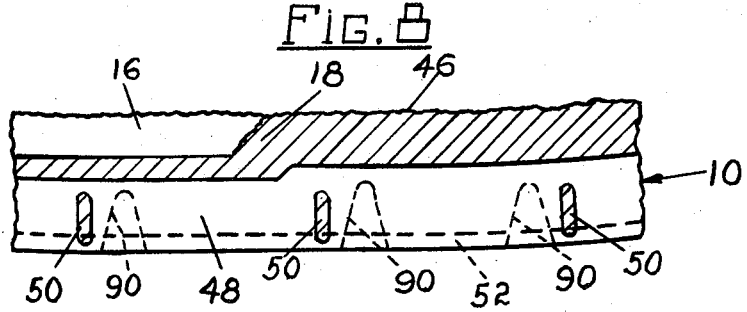
FIG. 8 is a longitudinal section of a portion of a frog which has been partially repaired and resurfaced by welding in accordance with the invention, but which is bowed upward at its ends.
Figure 9:
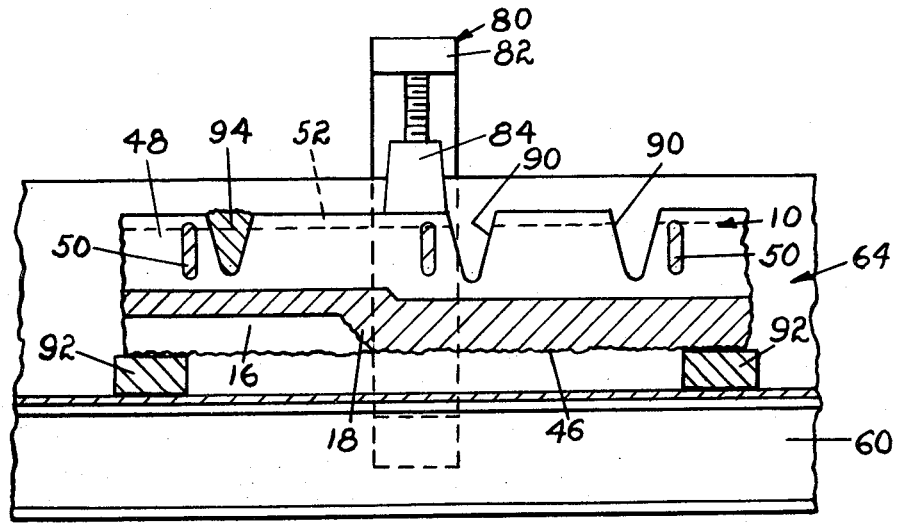
FIG. 9 is a somewhat diagrammatic side elevation illustrating the step of straightening the bowed condition of the partially repaired frog of FIG. 8.

8. Straighten. Straightening is done as illustrated in FIGS. 8 and 9. FIG. 8 is a vertical longitudinal section of a length of a frog 10 which is bowed, the length as shown being substantially from the section line 3—3 of FIG. 1 to the section line 5—5 of FIG. 1, which includes the point 18 and the throat 16. The upper surfaces of the top wall 46 have been built up with weld metal but not yet machined to a smooth surface.

8a. Cut notches. To straighten the bowed frog, its side walls 48 and base flanges 52 are cut to form notches 90 upward from the bottom at selected points as shown in dotted lines in FIG. 8. These are desirably cut with an arc torch. Their location will depend on the location and degree of the bowing which is to be straightened, and they are located in a manner to permit the subsequent straightening operation to produce an upper wall 46 which is sufficiently straight for machining to the desired finish shape.

8b. Bend Straight. After the notches 90 have been cut, the frog is then bent straight, as in the manner illustrated in FIG. 9. Here, the frog 10 is laid on spaced blocks 92 on a suitable support, conveniently the bottom of the water tank 66 on the face of the table 60. One or more of the movable yokes 80 are then moved to a position overlying the center of the bend or bow, and downward pressure is exerted by a jack 84 to bend the frog 10 to a straight position as shown in FIG. 9. After the frog is straightened, and desirably while it is held straight and is partially submerged in a water bath in the tank 66, the notches 90 which were previously cut to permit the straightening are now filled in with weld metal 94. The straightened frog will then remain straight.

9. Cut apart if necessary. In case of severe bending or warping, where the notching procedure described above is not adequate, the frog may be completely cut apart at one or more places along its length, and then rewelded together in straight condition. In this case, instead of merely cutting notches, the cutting is continued all the way through the section of the frog pieces. The pieces are then clamped in a straight condition, as by clamping them against the face of the table 60, and in proper alignment, and the cut-apart pieces are welded back together in the straight relation.

10. Machine to Design Specifications. After the frog has been straightened, its renewed surfaces are then machined smooth to the level and shape of a new frog. This may be done with conventional planing or cutting-tool equipment commonly used for forming and finishing frogs and other track work. It is an advantage of the present invention that the new metal may be machined with cutting tools and does not require machining by grinding; but grinding may be used if desired or convenient. When the surfaces being finished extend to the ends of the wheel ways of the frog, as at the end of the surfaces 26 and 36 adjoining the rails 24 and 34 in FIG. 1, it is desirable to mount rail sections in alignment with the end of the frog, and to machine the frog surfaces to provide a smooth and straight alignment with the surface of the rail.

The foregoing sets forth a specific embodiment of my new method of repairing railway frogs. It is to be understood that this is by way of explanation and that the various steps of the process may be carried out in different ways and at least some of the steps may be carried in different orders. The important steps which characterize my new process are, first, that all the welding for repairing cracks and replacing worn and battered or work hardened material is done while the frog is held in a water bath to keep it as cool as possible, desirably at a temperature below 500°F. This permits the manganese steel casting to be cut and rewelded as described without irreparable damage to the casting itself, and particularly without cracking and with a minimum of warping. A second step which characterizes the invention is that the frog is straightened after welding by a procedure which includes first cutting the frog to permit straightening, and then rewelding while the frog is held in straight position. The cutting is desirably confined to notching the side walls and flanges of the frog as illustrated in FIG. 8, but may include cutting the frog completely in two.

The welding may be done with any of a number of commercially available welding materials. I had good success both in filling in cavities and in building up wear surfaces with weld rod and wire available from National Cylinder Gas Division of Chemtron Corporation, 840 No. Michigan Ave., Chicago, Ill., under the trademark "Wear-Arc", type "WH", which is said to produce weld metal having a typical analysis of 0.45% C, 4.25% Mn., 19.50% Cr., 0.60% Si., and 9.50% Ni.. For surface buildup, I have also used welding material available from National Cylinder Gas under the trademark "Wear-Arc", "Nickel Manganese Alloy" said to produce a typical analysis of 0.60% C., 14.0% Mn., 0.55% Si., and 4.0% Ni. Other suitable welding materials are available from The McKay Company, 105 Liberty Avenue, Pittsburgh, Pa., 15222, as follows: For filling in cavities, welding rod sold under the trademark "Hard Alloy 118" which carries notice of U.S. Pat. No. 3,231,709 and is said to provide a typical weld metal composition of 0.75% C., 16.50% Mn., 0.35% Si., 4.00% Cr., 1.10% Ni. For surface build up, either "Hard Alloy 118" or the material available from McKay as "Frogalloy", one grade "M" of which carries a notice of U.S. Pat. No. 2,436,867 and is said to produce a typical weld metal composition of 0.60% C., 3.90% Mn., 0.60% Si., 18.6% Cr., and 9.50% Ni.

I claim:

1. The method of repairing a cast manganese steel railway frog or the like, comprising
    removing damaged metal at wear surfaces and cracks to expose sound metal for the deposit of new metal in molten state as by welding,
    submerging the frog in a liquid cooling bath to a level close below the point of metal deposit,
    filling any deep cavities with weld metal while the frog is so submerged in the cooling bath,
    and depositing molten weld metal over the exposed sound metal at the wear surfaces to build the same back to a desired level, while the frog is so submerged in the cooling bath, removing the frog from the cooling bath,
    and subsequently machining the deposited weld metal to provide finished new wear surfaces.

2. The repair method of claim 1 in which the frog after the deposit of new metal to the wear surfaces is warped or bowed, which further comprises, prior to machining,
    cutting the frog from the bottom to form one or more notches in the side walls and base flanges thereof,
    bending the notched frog to straighten the same,
    and welding-in the notches while the frog is in straight position.

3. The repair method of claim 1 in which the frog after the deposit of new metal to the wear surfaces is warped or bowed, which comprises, prior to machining,
- cutting the frog apart transversely at one or more locations,
- positioning the separated parts of the frog in substantially straight aligned position,
- and re-welding the parts together while in such position.

4. The repair method of claim 1 further comprising clamping the frog in the cooling bath, to a rigid support, and thereby holding the same against warping or bending during deposit of molten metal thereon.

5. The repair method of claim 1 in which molten metal is deposited at the wear surfaces in a plurality of substantially continuous beads extending lengthwise of the frog.

6. The repair method of claim 4 in which molten metal is deposited at the wear surfaces in a plurality of substantially continuous beads extending lengthwise of the frog.

7. The repair method of claim 2 with the addition that the notches are welded in while the frog is clamped in straight position.

8. The repair method of claim 2 with the addition that the notches are welded in while the frog is clamped straight and partially submerged in a liquid cooling bath.

9. The repair method of claim 8 in which the cooling bath is a water bath.

10. The method of repairing a cast manganese-steel railway frog or the like, comprising
- cleaning the frog of foreign matter,
- removing damaged metal at wear surfaces and cracks to expose sound metal for the deposit of weld metal,
- submerging the frog in a liquid cooling bath to a level close below the point of weld-metal deposit,
- depositing weld metal to fill in the cavities formed during the removal of damaged metal and thereby to provide sound metal in said cavities at a level for deposit of resurfacing metal, while the frog is so submerged in the cooling bath,
- depositing weld metal in lengthwise beads on sound metal at the wear-surface areas of the frog to bring the same back to the desired level, while the frog is so submerged in the cooling bath, removing the frog from the cooling bath, removing warpage in the thus re-built frog by cutting notches in the side walls and base flanges thereof, from the bottom, at one or more points along the length of the frog, straightening the notched frog, filling the notches of the straightened frog by depositing weld metal therein, and subsequently machining the rebuilt and straightened frog to provide finished new wear surfaces on the frog.

11. The repair method of claim 10 in which the frog is clamped against bending in the water bath during the deposit of weld metal in the cavities and at the wear surface areas.

* * * * *